United States Patent
Maksimovic et al.

(10) Patent No.: US 6,868,503 B1
(45) Date of Patent: Mar. 15, 2005

(54) ADAPTIVE VOLTAGE SCALING DIGITAL PROCESSING COMPONENT AND METHOD OF OPERATING THE SAME

(75) Inventors: Dragan Maksimovic, Boulder, CO (US); Sandeep Dhar, Boulder, CO (US); Bruno Kranzen, San Jose, CA (US); Ravindra Ambatipudi, Milpitas, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 580 days.

(21) Appl. No.: 10/053,226

(22) Filed: Jan. 19, 2002

(51) Int. Cl.[7] .................................................. G06F 1/06
(52) U.S. Cl. ...................................... 713/401; 713/400
(58) Field of Search ......................................... 713/401

(56) References Cited

U.S. PATENT DOCUMENTS

| | | | | |
|---|---|---|---|---|
| 4,068,159 A | * | 1/1978 | Gyugyi ........................ 323/211 |
| 5,166,959 A | * | 11/1992 | Chu et al. ...................... 377/20 |
| 5,264,745 A | * | 11/1993 | Woo ............................. 326/62 |
| 6,121,758 A | * | 9/2000 | Bellina et al. ............... 323/211 |
| 6,424,184 B1 | * | 7/2002 | Yamamoto et al. .......... 327/102 |
| 6,535,735 B2 | * | 3/2003 | Underbrink et al. ......... 323/283 |

* cited by examiner

Primary Examiner—John R. Cottingham

(57) ABSTRACT

There is disclosed a digital circuit comprising a digital processing component, an adjustable power supply and power supply adjustment circuitry. The digital processing component is capable of operating at a plurality of selected clock frequencies, wherein a maximum delay time of a critical path in the digital processing component is determined by a level of a power supply, VDD, of the digital processing component. The adjustable power supply is capable of supplying VDD to the digital processing component. The power supply adjustment circuitry is operable to receive a first selected clock signal and adjusts the level of VDD such that the maximum delay time of the critical path of the digital processing component is less than a pulse-width duration between a first clock edge of the first selected clock signal and a second clock edge of the first selected clock signal immediately following the first clock edge.

24 Claims, 6 Drawing Sheets

ADAPTIVE VOLTAGE SCALING DIGITAL PROCESSING COMPONENT AND METHOD OF OPERATING THE SAME

CROSS-REFERENCE TO RELATED APPLICATIONS

The present invention is related to those disclosed in the following United States Patent Applications:

1. Ser. No. 10/053,227, filed concurrently herewith, entitled "AN ADAPTIVE VOLTAGE SCALING CLOCK GENERATOR FOR USE IN A DIGITAL PROCESSING COMPONENT AND METHOD OF OPERATING THE SAME;"

2. Ser. No. 10/053,858, filed concurrently herewith, entitled "SYSTEM FOR ADJUSTING A POWER SUPPLY LEVEL OF A DIGITAL PROCESSING COMPONENT AND METHOD OF OPERATING THE SAME;" and 3. Ser. No. 10/053,228, filed concurrently herewith, entitled "AN ADAPTIVE VOLTAGE SCALING POWER SUPPLY FOR USE IN A DIGITAL PROCESSING COMPONENT AND METHOD OF OPERATING THE SAME."

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to low power integrated circuits and, more specifically, to systems for adjusting a power supply level of a digital processing component and methods of operating the same.

BACKGROUND OF THE INVENTION

In recent years, there have been great advancements in the speed, power, and complexity of integrated circuits (ICs), such as application specific integrated circuit (ASIC) chips, central processing unit (CPU) chips, digital signal processor (DSP) chips and the like. These advancements have made possible the development of system-on-a-chip (SOC) devices, among other things. A SOC device integrates into a single chip all (or nearly all) of the components of a complex electronic system, such as a wireless receiver (i.e., cell phone, a television receiver, and the like).

An important criteria in evaluating the performance of an electronic device is power consumption. Minimizing power consumption has long been an important design consideration in portable devices that operate on battery power. Since maximizing battery life is a critical objective in a portable device, it is essential to minimize the power consumption of ICs used in the portable device. More recently, minimizing power consumption has also become more important in electronic devices that are not portable. The increased use of a wide variety of electronic products by consumers and businesses has caused corresponding increases in the electrical utility bills of homeowners and business operators. The increased use of electronic products also is a major contributor to the increased electrical demand that has caused highly publicized power shortages in the United States, particularly California.

Many complex electronic components, such as CPUs and DSPs, are capable of operating a number of different clock speeds. Generally speaking, if an electronic component operates at a slower speed, it uses less power because there are less signal level transitions in a given time period during which power is consumed. The speed at which logic gates switch in a DPU and DSP is directly affected by the level of the power supply, VDD, connected to the gates. As VDD gets larger, there is greater voltage and current to drive gates, so rise times and propagation delays across gates decrease. Conversely, as VDD gets smaller, rise times and propagation delays across gates increase. Thus, if a CPU or DSP must operate a relatively high clock frequency, such as 800 MHz, VDD is set to a high level, such as +3.3 volts or +2.4 volts. If a CPU or DSP can operate a relatively slow clock frequency, such as 50 MHz, VDD may be set to a low level, such as +1.2 volts.

Unfortunately, prior art applications do not provide any means for finely adjusting the level of VDD to a wide number of clock speeds. Typically, a DSP or CPU may operate in only two modes: a +3.3 volt high power mode and a +1.2 volt low power mode, for example. Thus, in the example above, if the CPU or DSP must operate at 100 MHz instead of 50 MHz, the +1.2 volt VDD level used at 50 MHz may not be sufficient to operate at 100 MHz. Thus, the DSP or CPU will be required to operate at VDD of +3.3 volts. However, at a VDD level of +3.3 volts, the CPU or DSP may consume far more power that is necessary to operate at 100 MHz.

Therefore, there is a need in the art for circuits and methods for finely adjusting the level of VDD in a large scale digital integrated circuit (e.g., DSP, CPU) to match a wide number of clock speeds. In particular, there is a need for circuits and methods that finely adjust VDD to an optimum level to ensure that the rise times and propagation delays of the large scale digital integrated circuit are closely matched to the clock speed at which the large scale digital integrated circuit operates.

SUMMARY OF THE INVENTION

To address the above-discussed deficiencies of the prior art, it is a primary object of the present invention to provide a critical path slack-time discriminator for dynamic adaptive voltage scaling regulators. According to one advantageous embodiment, control circuitry is introduced for adjusting a power supply level (VDD) of a digital processing component of a digital circuit having varying operating frequencies.

The exemplary digital circuit comprises a digital processing component, an adjustable power supply, as well as power supply adjustment circuitry. The digital processing component is capable of operating at a plurality of selected clock frequencies, wherein a maximum delay time of a critical path in the digital processing component is determined by a level of a power supply, VDD, of the digital processing component. The adjustable power supply is capable of supplying VDD to the digital processing component. The power supply adjustment circuitry is operable to receive a first selected clock signal and adjusts the level of VDD such that the maximum delay time of the critical path of the digital processing component is less than the pulse-width duration between a first clock edge of the first selected clock signal and a second clock edge of the first selected clock signal immediately following the first clock edge.

One important aspect of this exemplary digital circuit is that, in steady-state, VDD is such that the digital processing component operates correctly and power consumption is at least substantially the minimum possible power consumption at the requested clock frequency ($f_{clk}$). Another important aspect hereof is that the operation of the digital circuit is sufficient to meet all operating conditions, including process and temperature variations, and including transients initiated by changes in requested clock frequency. Yet another important aspect hereof is that the operation of the digital circuit utilizes insubstantial processing resources of the digital processing component other than resources necessary to generate a frequency control signal (it should be noted that in certain advantageous embodiments hereof, the digital circuit hereof may suitably be configured so that the digital processing component does not generate the frequency control signal).

According to an advantageous embodiment, the exemplary power supply adjustment circuitry comprises N delay cells coupled in series, each of the N delay cells having a delay D determined by the level of VDD, wherein the first clock edge is applied to an input of a first delay cell and ripples sequentially through the N delay cells. The power supply adjustment circuitry is further operable to: (i) monitor outputs of at least a K delay cell and a K+1 delay cell, (ii) determine that the first clock edge has reached an output of the K delay cell and has not reached an output of the K+1 delay cell, and (iii) generate a control signal capable of adjusting VDD.

According to a related embodiment, the exemplary power supply adjustment circuitry determines that the first clock edge has reached the K delay cell output and has not reached the K+1 delay cell output when the second clock edge is applied to the first delay cell input.

According to further related embodiment, a total delay from the first delay cell input to the K delay cell output is greater than the maximum delay time of the critical path.

According to a further embodiment, the exemplary power supply adjustment circuitry is further operable to: (i) increase VDD if the first clock edge has not reached the K delay cell output, and (ii) decrease VDD if the first clock edge has reached the K+1 delay cell output.

According to a further related embodiment, the exemplary power supply adjustment circuitry is further operable to monitor outputs of at least a K−1 delay cell, the K delay cell, the K+1 delay cell, and a K+2 delay cell. The exemplary power supply adjustment circuitry is further operable to determine that the first clock edge has reached an output of the K−1 delay cell and the K delay cell output and has not reached the K+1 delay cell output.

The power supply adjustment circuitry is operable to increase VDD in relatively large incremental steps if the first clock edge has not reached the K−1 delay cell output, and increase VDD in relatively small incremental steps if the first clock edge has reached the K−1 delay cell output but has not reached the K delay cell output.

Similarly, the power supply adjustment circuitry is operable to decrease VDD in relatively large incremental steps if the first clock edge has reached the K+1 delay cell output and the K+2 delay cell output, and decrease VDD in relatively small incremental steps if the first clock edge has reached the K+1 delay cell output but has not reached the K+2 delay cell output.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "circuitry" means any circuit, device, component, controller, processor or part thereof, and vice-versa that controls at least one operation, such circuitry may, if appropriate, be implemented in hardware, firmware or software, or some combination of at least two of the same, as the case may be. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged digital processing system.

Figure 1:
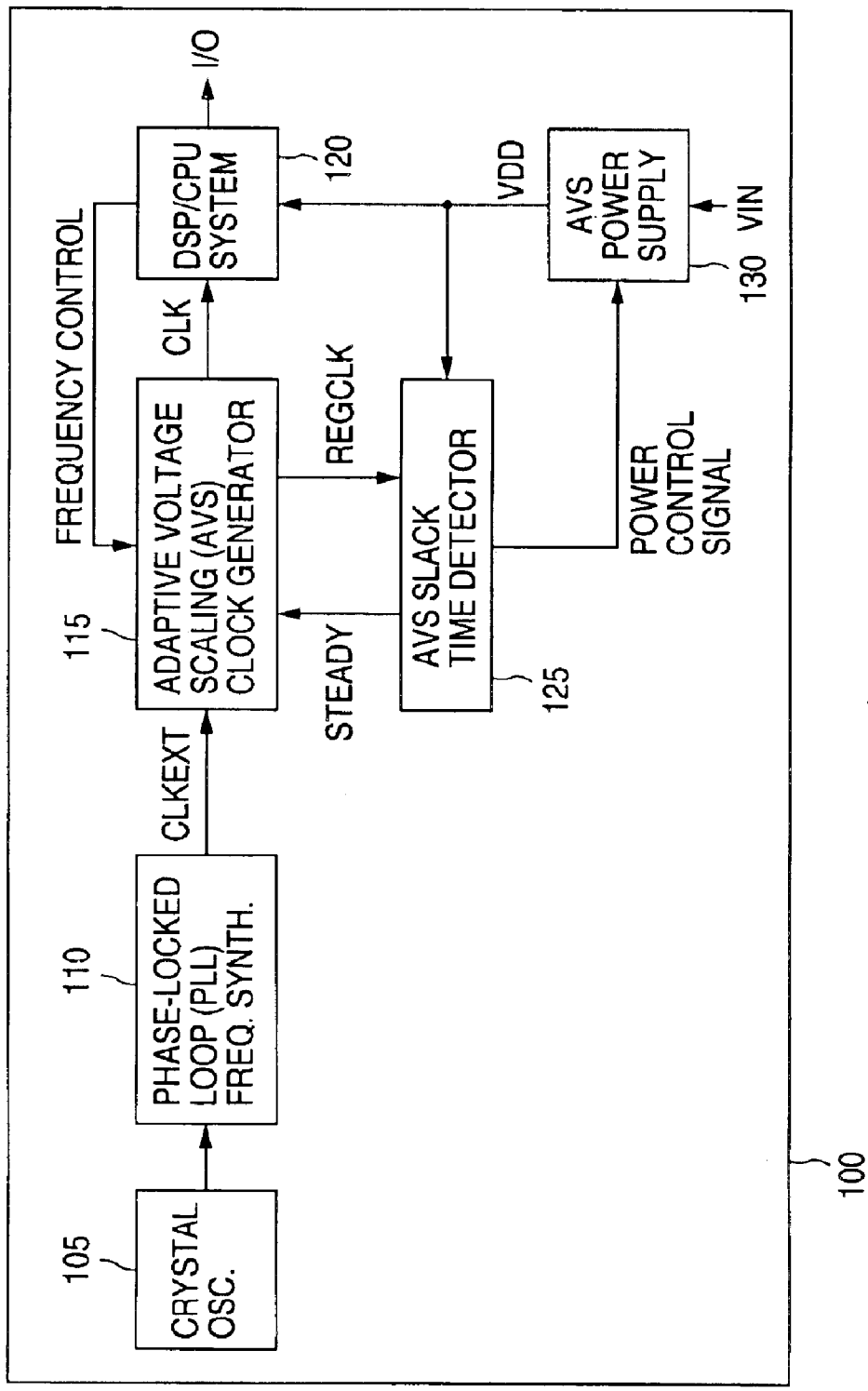
FIG. 1 illustrates a block diagram of digital processing system according to one exemplary embodiment of the present invention.

FIG. 1 illustrates a block diagram of digital processing system 100 according to one exemplary embodiment of the present invention. Digital processing system 100 comprises crystal oscillator 105, phase-locked loop (PLL) frequency synthesizer 110, adaptive voltage scaling (AVS) clock generator 115, a digital processing component, labeled DSP/CPU system 120, adaptive voltage scaling (AVS) slack-time detector 125, and adaptive voltage scaling (AVS) power supply 130.

Exemplary crystal oscillator 105 generates an output reference frequency signal in which the reference frequency of the output is determined by the mechanical properties of a piezoelectric crystal. Exemplary PLL frequency synthesizer 110 is coupled to the output of crystal oscillator 105 and generates CLKEXT signal, which has an operating frequency that is a multiple of the reference frequency provided by crystal oscillator 105. The CLKEXT signal may represent a set of clock frequencies.

Exemplary AVS clock generator 115 is coupled to the output of PLL frequency synthesizer 110, digital processing component 120 and AVS slack-time detector 125 and respectively receives as inputs CLKEXT signal, a FREQUENCY CONTROL signal and a STEADY signal. The FREQUENCY CONTROL signal sets the desired operating clock frequency, $f_{clk}$, which is typically some fraction of the CLKEXT signal. For example, if the CLKEXT signal is 1.6 Ghz, AVS clock generator 115 may divide the CLKEXT signal by four to produce a 400 MHz clock as the CLK signal supplied to DSP/CPU system 120. As will be explained below in greater detail, the STEADY signal indicates to AVS clock generator 115 that the power supply voltage, VDD, has been adjusted to a sufficient level to match the desired clock speed of the CLK signal. When STEADY is enabled, the CLK signal is applied to DSP/CPU system 120.

In summary, exemplary AVS clock generator 115 preferably receives (i) a clean, low-jitter clock input (CLKEXT), which is illustratively generated by crystal oscillator 105 followed by a PLL frequency synthesizer 110, though any other suitable means is sufficient; (ii) a digital FREQUENCY CONTROL input signal which determines a scale factor ($n_{clk}$; the ratio between the frequency of the clock signal (CLKEXT), and the clock signal (CLK) delivered to DSP/CPU system 120, $n_{clk}=f_{clk}/f_{clkext}$); and (iii) a digital STEADY input signal from AVS slack time detector 125, which operates to indicate that VDD has reached a desired steady-state value. Exemplary AVS clock generator 115 preferably generates (i) a clean, low-jitter clock signal (CLK) for CPU/DSP system 120, the frequency of which is proportional to the frequency of CLKEXT, and with a factor of proportionality $n_{clk}$ preferably determined by the FREQUENCY CONTROL signal; and (ii) a clock signal (REGCLK) for AVS slack-time detector 125, the frequency of which is proportional to the frequency of CLKEXT, and with, a factor of proportionality $n_{regclk}$ (the ratio between the frequency of the clock signal (REGCLK), and the clock signal (CLKEXT), $n_{regclk}=f_{regclk}/f_{clkext}$) preferably also determined by the FREQUENCY CONTROL signal.

In operation, if the desired operating frequency is lower than the current operating frequency, the frequencies of both the system clock CLK and the regulator clock signal, REGCLK, are changed at the same time to the new value $f_{regclk}=a(f_{clk})$, where "a" is a constant, for example "a=1" or "a=½". If the desired operating frequency is higher than the current operating frequency, the frequency of REGCLK is changed first. Then, when the VDD supply voltage reaches the new steady-state value, the STEADY signal is activated, and the system clock frequency is updated to $f_{clk}=f_{regclk}/a$. If "a =1", in steady state, CLK and REGCLK have the same frequency and phase.

Generally, speaking DSP/CPU system 120 may be any digital processing component designed for performing mathematical computations and may suitably be programmable, meaning that digital processing component 120 may be used for manipulating different types of information, including sound, images, video, and the like. According to the present embodiment, DSP/CPU system 120 has varying operating frequencies and is coupled to the output of AVS clock generator 115 and AVS power supply 130. DSP/CPU system 120 generates the FREQUENCY CONTROL signal, and communicates input/output (I/O) data with an associated processing system (not shown (e.g., mobile communication unit, computing system, and the like). The FREQUENCY CONTROL signal may illustratively be any $n_{freq}$-bit command word generated by DSP/CPU system 120 (or by any other suitable system circuitry).

Exemplary AVS slack-time detector 125 is a critical path slack-time discriminator in accordance with the principles of the present invention. AVS slack-time detector 125 comprises N delay cells and power supply adjustment circuitry (shown with reference to FIG. 2), and operable to control AVS power supply 130 to adjust VDD. The N delay cells are coupled in series, each of which has a delay (D) determined by a value of VDD, such that a clock edge applied to an input of a first delay cell ripples sequentially through the N delay cells. The power supply adjustment circuitry, which is associated with the N delay cells, is capable of adjusting VDD and is operable to (i) monitor outputs of at least a K delay cell and a K+1 delay cell, (ii) determine that the clock edge has reached an output of the K delay cell and has not reached an output of the K+1 delay cell, and (iii) generate a control signal capable of adjusting VDD in response thereto.

In summary, exemplary AVS slack-time detector 125 preferably (i) receives the clock signal (REGCLK) from AVS clock generator 115 and (ii) produces (a) a POWER CONTROL signal for AVS power supply 130 as a function of the measurement of the slack time by reference to the period $1/f_{regclk}$ of REGCLK, and (b) a digital STEADY signal for AVS clock generator 115. The POWER CONTROL signal may suitably be analog or digital and operates to direct AVS power supply 130 to increase VDD, decrease VDD, or maintain VDD unchanged. In short, by enabling the STEADY signal, AVS slack time detector 125 indicates that VDD has reached the desired steady state value.

In summary also, exemplary AVS power supply 130 preferably (i) receives the POWER CONTROL signal from AVS slack time detector 125 directing AVS power supply 130 to increase VDD, decrease VDD, or maintain VDD unchanged, and (ii) produces a well-regulated, low-noise supply voltage (VDD) for CPU/DSP system 120 and AVS slack-time detector 125 (as directed by the POWER CONTROL signal). VDD is well-regulated, meaning independent of the values of the load current or an external supply voltage (VIN).

Figure 1A:
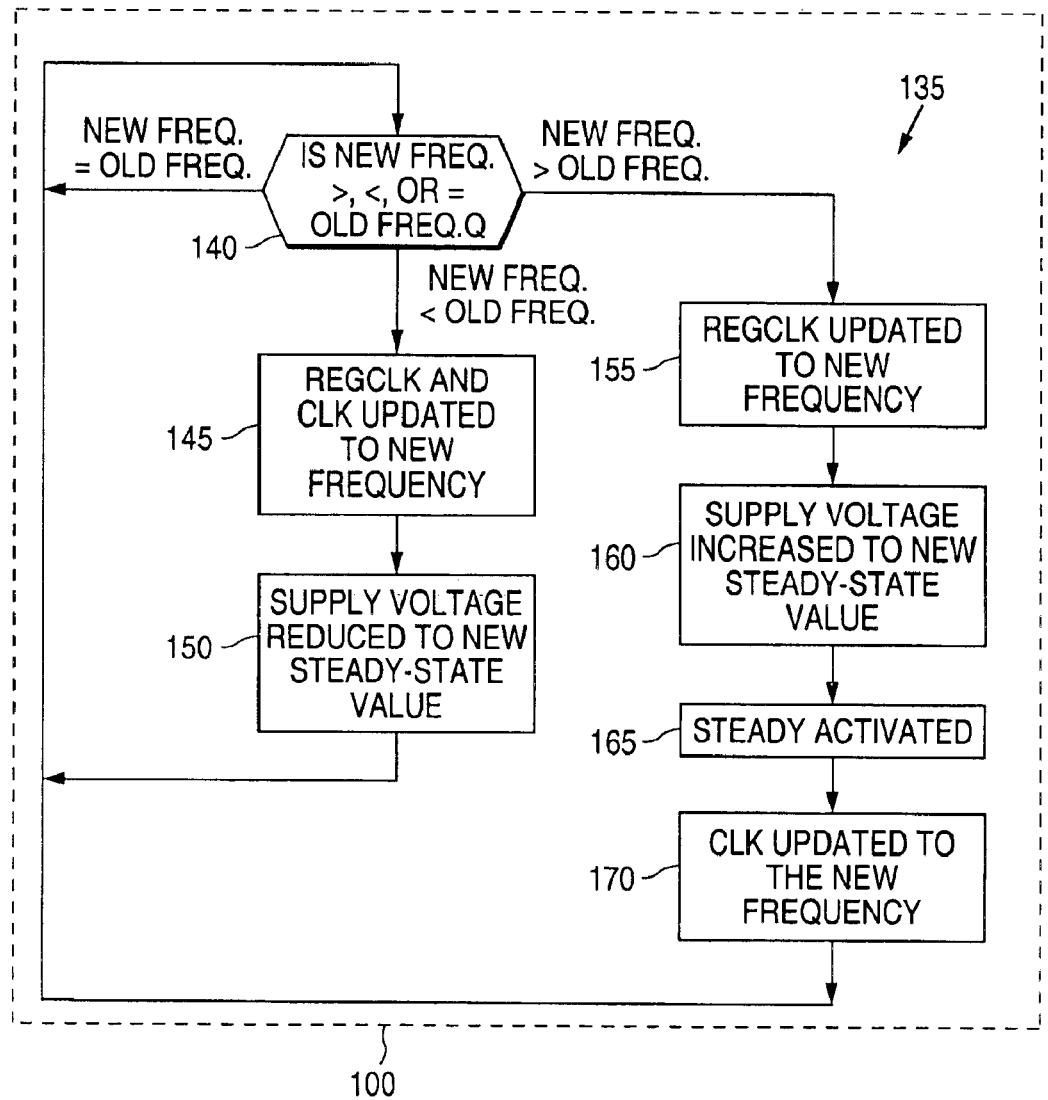
FIG. 1A depicts a flow diagram which illustrates an exemplary method of operating of the exemplary digital processing system according to the embodiment of FIG. 1.

FIG. 1A depicts a flow diagram (generally designated 135) which illustrates an exemplary method of operating of digital processing system 100 according to the embodiment of FIG. 1. For purposes of discussion, concurrent reference is made to FIG. 1. The description of this embodiment is by why of example and is not intended to limit the scope of the present invention.

Digital processing system 100 maintains steady state operation until a "new" clock frequency is requested under the direction of FREQUENCY CONTROL signal. In steady state, clock signals CLK and REGCLK have frequencies ($f_{clk}$ and $f_{regclk}$) proportional to the frequency of clock signal CLKEXT ($f_{clkext}$). The factors of proportionality, $n_{clk}$ and $n_{regclk}$, respectively, are determined by the FREQUENCY CONTROL signal. $f_{clk}$ and $f_{regclk}$ are either the same, or related through a constant scale factor $n_c$ (ratio of the frequency of CLK and the frequency of REGCLK, $n_c=f_{regclk}/f_{clk}$). VDD is such that CPU/DSP system 120 operates correctly and utilizes a minimum or substantially minimum power at $f_{clk}$ of the clock CLK.

When a new clock frequency is requested, digital processing system 100 senses a change in the FREQUENCY CONTROL signal, and AVS clock generator 115 determines whether the new frequency is higher or lower than the current frequency of the clock clk supplied to the CPU/DSP system 120 (process step 140).

If the "new" requested clock frequency is lower than the current operating frequency ("<" branch of process step 140), then AVS clock generator 115 preferably updates at least substantially simultaneously both CLK and REGCLK to new values (process step 145; again, $f_{clk}$ and $f_{regclk}$ are either the same, or related through a constant scale factor $n_c$).

When AVS slack-time detector 125 receives REGCLK at the new, lower clock frequency, it determines that the slack time in system 100 is too great, and generates the POWER CONTROL signal to AVS power supply 130 to reduce VDD (process step 150). AVS power supply 130 receives the POWER CONTROL signal from AVS slack-time detector 125 and reduces VDD.

AVS slack-time detector 125 continues to test system slack time, and when slack-time detector 125 determines that system slack time is adequate, it generates the POWER CONTROL signal to AVS power supply 130 to maintain a "current" value of VDD. At this time, the frequency-change transient is completed and system 100 is in a "new" steady state.

If the "new" requested clock frequency is higher than the current operating frequency (">" branch of process step 140), then AVS clock generator 115 updates only REGCLK to a new value (process step 155), and CLK remains the same.

When AVS slack-time detector 125 receives REGCLK at the new, higher clock frequency, it determines that the slack time in system 100 is too low, and generates the POWER CONTROL signal to AVS power supply 130 to increase VDD (process step 160). AVS power supply 130 receives the POWER CONTROL signal from AVS slack-time detector 125 and increases VDD.

AVS slack-time detector 125 continues to test system slack time, and when slack-time detector 125 determines that system slack time is adequate, it generates the POWER CONTROL signal to AVS power supply 130 to maintain a "current" value of VDD. AVS slack-time detector 125 activates the STEADY signal indicating that VDD has reached the "new" steady-state value (process step 165).

When AVS clock generator 115 receives the activated STEADY signal, it updates CLK to the new, higher requested clock frequency (process step 170). At this time, the clock frequencies of $f_{clk}$ and $f_{regclk}$ are either the same, or related through a constant scale factor $n_c$.

Again, an important aspect of this exemplary embodiment is that, in steady-state, VDD is such that the digital processing component operates correctly and power consumption is at least substantially the minimum possible power consumption at the requested clock frequency ($f_{clk}$). A further aspect is that the operation of system 100 is sufficient to meet all operating conditions, including process and temperature variations, and including transients initiated by changes in requested clock frequency. Finally, the operation of system 100 utilizes insubstantial processing resources of DSP/CPU system 120 other than resources necessary to generate FREQUENCY CONTROL signal.

Figure 2:
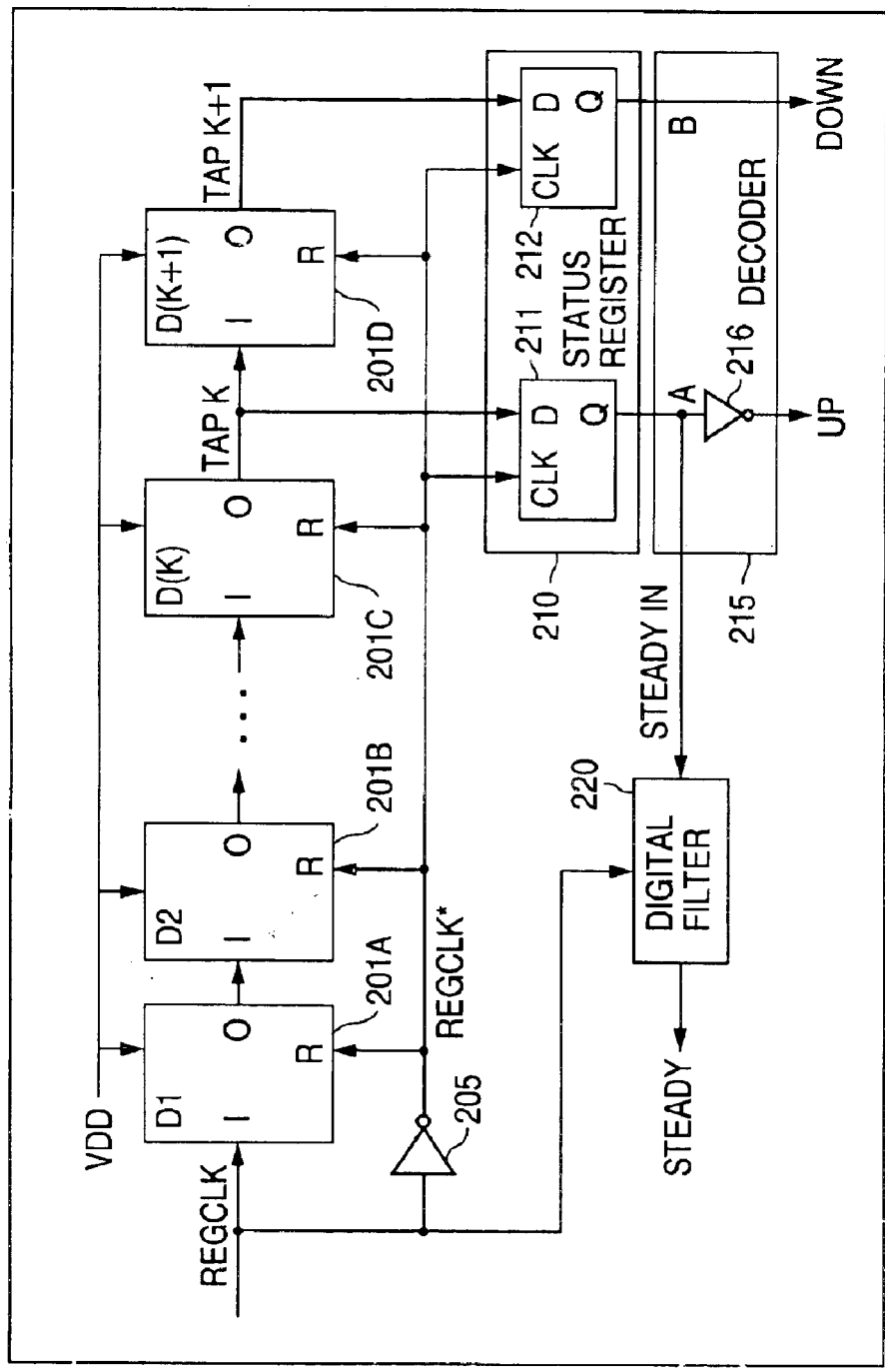
FIG. 2 illustrates the adaptive voltage scaling (AVS) slack time detector of FIG. 1 in greater detail according to an exemplary embodiment of the present invention.

FIG. 2 illustrates AVS slack time detector 125 in greater detail according to an exemplary embodiment of the present invention. AVS slack time detector 125 comprises N sequential delay cells 201, including exemplary delay cells 201A, 201B, 201C, and 201D, inverter 205, status register 210, decoder 215, and digital filter 220. Status register 210 further comprises edge-triggered flip-flop (FF) 211 and edge-triggered flip-flop (FF) 212. Decoder 215 comprises inverter 216.

A rising edge on the REGCLK clock signal will ripple sequentially through each of the delay cells in the chain of N sequential delay cells 201. The N delay cells 201 are identical components and are made from the same process as the gates in DSP/CPU system 120. Thus, each of the delay cells in the chain of N delay cells has a variable propagation delay, D, between its input (I) and its output (O) that is substantially equal to the variable propagation delay, D, of all of the other N delay cells 201. The propagation delays are said to be variable because the level of the power supply, VDD, affects the propagation delay, D. As VDD increases, the propagation delay, D, of each of the N delay cells 201 decreases. As VDD decreases, the propagation delay, D, of each of the N delay cells 201 increases.

Thus, for a given value of VDD, the combined propagation delay from the input of the first delay cell (i.e., delay cell 201A) to the output of the K delay cell (i.e., delay cell 201C) is K·D (i.e., K times D). Exemplary delay cells 201A, 201B, 201C, and 201D are sequentially labeled by their respective delay periods D1, D2, D(K), and D(K+1). The combined propagation delay, K×D, from the input of the first delay cell to the output of the K delay cell is designed to model the longest propagation delay through DSP/CPU system 120, including a safety margin of M propagation delays, scaled by ar appropriate factor in case a*1.

For example, if the longest propagation delay through DSP/CPU system 120 is less than or equal to 6D (i.e., six propagation delays), then the value of K may be set to 8, so that the output of the K delay cell represents eight propagation delays (8D) and the safety margin, M, is two propagation delays. In an alternate embodiment, the value of K may be set to 7, so that the output of the K delay cell represents seven propagation delays (7D) and the safety margin, M, is one propagation delay. In still another alternate embodiment, the value of K may be set to 9, so that the output of the K delay cell represents nine propagation delays (9D) and the safety margin, M, is three propagation delays.

If the value of VDD increases, the longest propagation delay through DSP/CPU system 120 decreases and if the value of VDD decreases, the longest propagation delay through DSP/CPU system 120 increases. However, since the delay cells 201 are fabricated from the same process as the gates in DSP/CPU system 120, the combined delay, K·D, at the output of the K delay cell (i.e. delay cell 201C) changes proportionally, thereby tracking the longest propagation delay through DSP/CPU system 120. The purpose of AVS slack time detector 125 is to control the level of VDD so that a rising edge on the REGCLK clock signal received at the input of delay cell 201A propagates to the output of the K delay cell (i.e., delay cell 201C), but not to the output of the K+1 delay cell, by the time a falling edge on the REGCLK clock signal is received. If the rising edge propagates to the output of the K+1 delay cell (i.e., delay cell 201D) or beyond, then VDD is too large for the current clock speed of the REGCLK clock signal and power is being wasted. If the rising edge does not propagate at least as far as the output of the K delay cell (i.e., delay cell 201C), then VDD is too low for the current clock speed of the REGCLK clock signal and an error may occur due to the longest propagation delay through DSP/CPU system 120.

Figure 3:
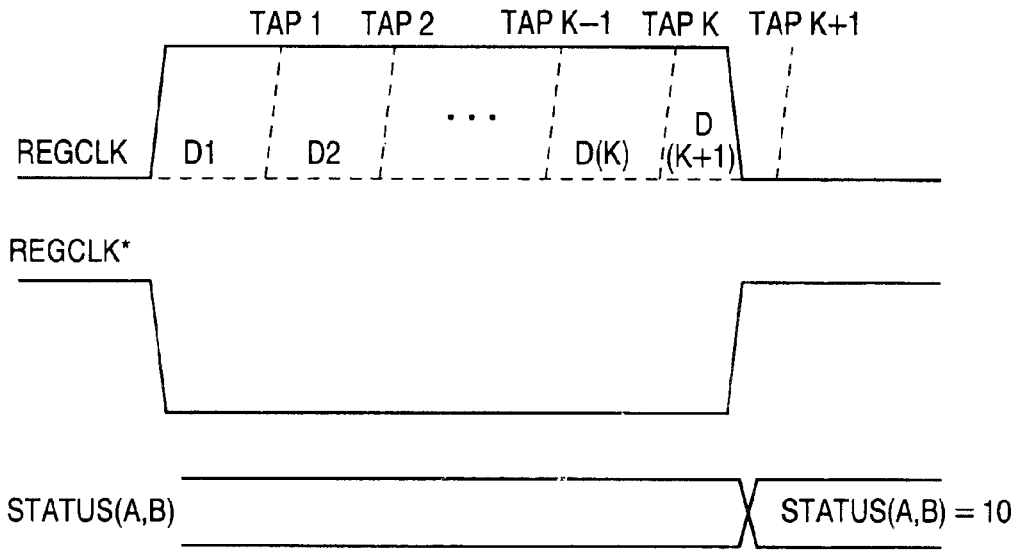
FIG. 3 illustrates a timing diagram illustrating the operation of the adaptive voltage scaling (AVS) slack time detector according to the exemplary embodiment illustrated in FIG. 2.

FIG. 3 is a timing diagram illustrating the operation of AVS slack time detector 125 according to the exemplary embodiment illustrated in FIG. 2. One illustrative clock pulse is shown.

Initially, the REGCLK clock signal is low (Logic 0). Inverter 205 inverts the REGCLK clock signal to produce the REGCLK* clock signal, which is applied to the reset (R) inputs of each of the N delay cells 201. Initially, the REGCLK* clock signal is high (Logic 1), which forces the output (O) of each delay cell 201 to Logic 0.

When the REGCLK clock signal goes to Logic 1 (i.e., rising edge of clock pulse), the REGCLK* clock signal goes to Logic 0, thereby removing the reset (R) signal from all of the delay cells 201. After a first propagation delay, D1, the output of delay cell 201A, referred to as Tap 1, goes to Logic 1 (as shown by dotted line). After a second propagation delay, D2, the output of delay cell 201B, referred to as Tap 2, goes to Logic 1.

The rising edge continues to propagate through the chain of N delay cells 201.

After the K propagation delay, D(K), the output of delay cell 201C, referred to as Tap K, goes to Logic 1 (as shown by dotted line).

After the K+1 propagation delay, D(K+1), the output of delay cell 201D, referred to as Tap K+1, would normally go to Logic 1.

However, the falling edge of the REGCLK clock signal occurs before the K+1 propagation delay completes. The falling edge of the REGCLK clock signal causes the REGCLK* clock signal to go to Logic 1 (i.e., rising edge), thereby applying a reset (R) signal to all of the N delay cells 201 and resetting the outputs (O) of all delay cells 201 back to Logic 0

Flip-flop (FF) 211 in status register 210 monitors the output of delay cell 201C (i.e., Tap K) and flip-flop (FP) 212 in status register 210 monitors the output of delay cell 201D (i.e., Tap K+1). The rising edge of the REGCLK* clock signal causes FF 211 and FF 212 to read the values of the outputs of delay cells 201C and 201D before the outputs are reset. Thus, the status of the outputs of delay cells 201C and 201D, referred to as STATUS(A,B), are read on every falling edge of the REGCLK clock signal (i.e., the rising edge of the REGCLK* clock signal).

Under optimum conditions, the rising edge of the REGCLK clock signal propagates only as far as the output of the K delay cell (i.e., delay cell 201C). Thus, under optimum conditions, A=1, B=0, and STATUS(A,B)=10. If VDD is too low, the rising edge of the REGCLK clock signal fails to propagate as far as the output of the K delay cell and STATUS(A,B)=00. If VDD is too high, the rising edge of the REGCLK clock signal propagates at least as far as the output of the K+1 delay cell and STATUS(A,B)=11.

Decoder 215 reads the value of STATUS(A,B) and produces the control signal UP, which increases VDD, and the control signal DOWN, which decreases VDD, accordingly. Under optimum conditions, STATUS(A,B)=10, so that UP=0 and DOWN=0, and VDD is not changed. If VDD is too low, STATUS(A,B)=00, so that UP=1 and DOWN=0, and VDD is increased. If VDD is too high, STATUS(A,B)=μl, so that UP=O and DOWN=1, and VDD is decreased.

According to an exemplary embodiment, the value of A, which corresponds to the K delay cell output is, represents the raw signal, STEADY IN. The STEADY IN signal may fluctuate between 0 and 1 until the value of VDD is adjusted to a stable level. Digital filter 220 receives STEADY IN and determines when STEADY IN has become stable at Logic 1 before setting the STEADY signal at its output to Logic 1, thereby enabling AVS clock generator 115. For example, digital filter 220 may be a counter that counts ten consecutive values of STEADY IN=1 before the STEADY signal is set to Logic 1. If STEADY IN switches to a Logic 0 before a count of ten is reached, the counter is reset to zero and the count starts over.

Figure 4A:
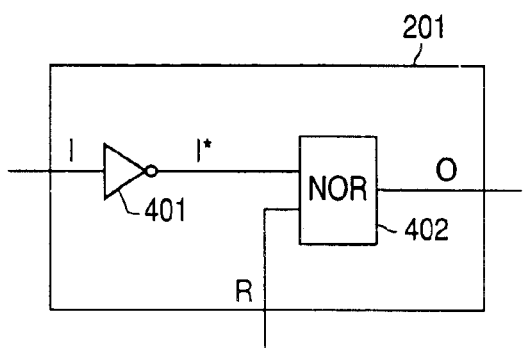
FIG. 4A illustrates an exemplary delay cell according to a first exemplary embodiment of the present invention.

FIG. 4A illustrates exemplary delay cell 201 according to a first exemplary embodiment of the present invention. Delay cell 201 comprises inverter 401 and NOR gate 402. When the reset signal (R) is Logic 1, the output (O) of NOR gate 402 is forced to Logic 0 and the input (I) is irrelevant. When the reset signal (R) is Logic 0, the input I can pass through to the output (O) of NOR gate 402. Thus, if R=0, a rising edge at the input (I) of delay cell 201 is inverted by inverter 401 and inverted again by NOR gate 401. Thus, a rising edge appears at the output (O) of delay cells 201 after a total delay equal to the combined propagation delays of inverter 401 and NOR gate 402.

Figure 4B:
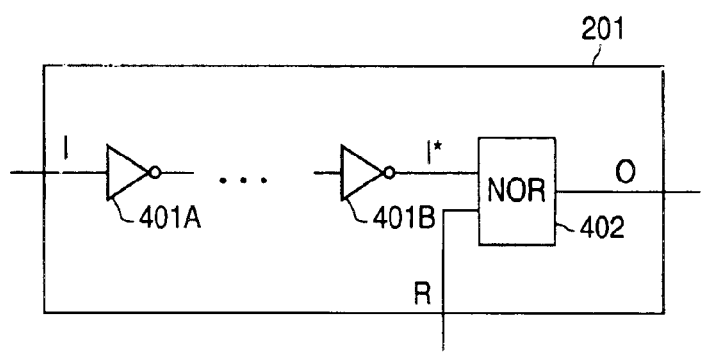
FIG. 4B illustrates an exemplary delay cell according to a second exemplary embodiment of the present invention.

FIG. 4B illustrates exemplary delay cell 201 according to a second exemplary embodiment of the present invention. Delay cell 201 comprises NOR gate 402 and an odd number of sequential inverters 401, including exemplary inverters 401A and 401B, and NOR gate 402. When the reset signal (R) is Logic 1, the output (O) of NOR gate 402 is forced to Logic 0 and the input (I) is irrelevant. When the reset signal (R) is Logic 0, the input I can pass through to the output (O) of NOR gate 402. Thus, if R=0, a rising edge at the input (I) of delay cell 201 is sequentially inverted an odd number of times by inverters 401A through 401B, and is then inverted one last time by NOR gate 401.

Thus, an even number of inversions occur and a rising edge appears at the output (O) of delay cells 201 after a total delay equal to the combined propagation delays of NOR gate 402 and all of the inverters 401A through 401B. Thus, the total delay of delay cell 201 may be manipulated by varying the number of inverters 401 in delay cell 201. Also, those skilled in the art will recognize that other types of gates that perform an inverting function may be used in place of simple inverters 401.

In general, any type of gate that receives an input I and generates an inverted output, I*, may be used.

Figure 5:
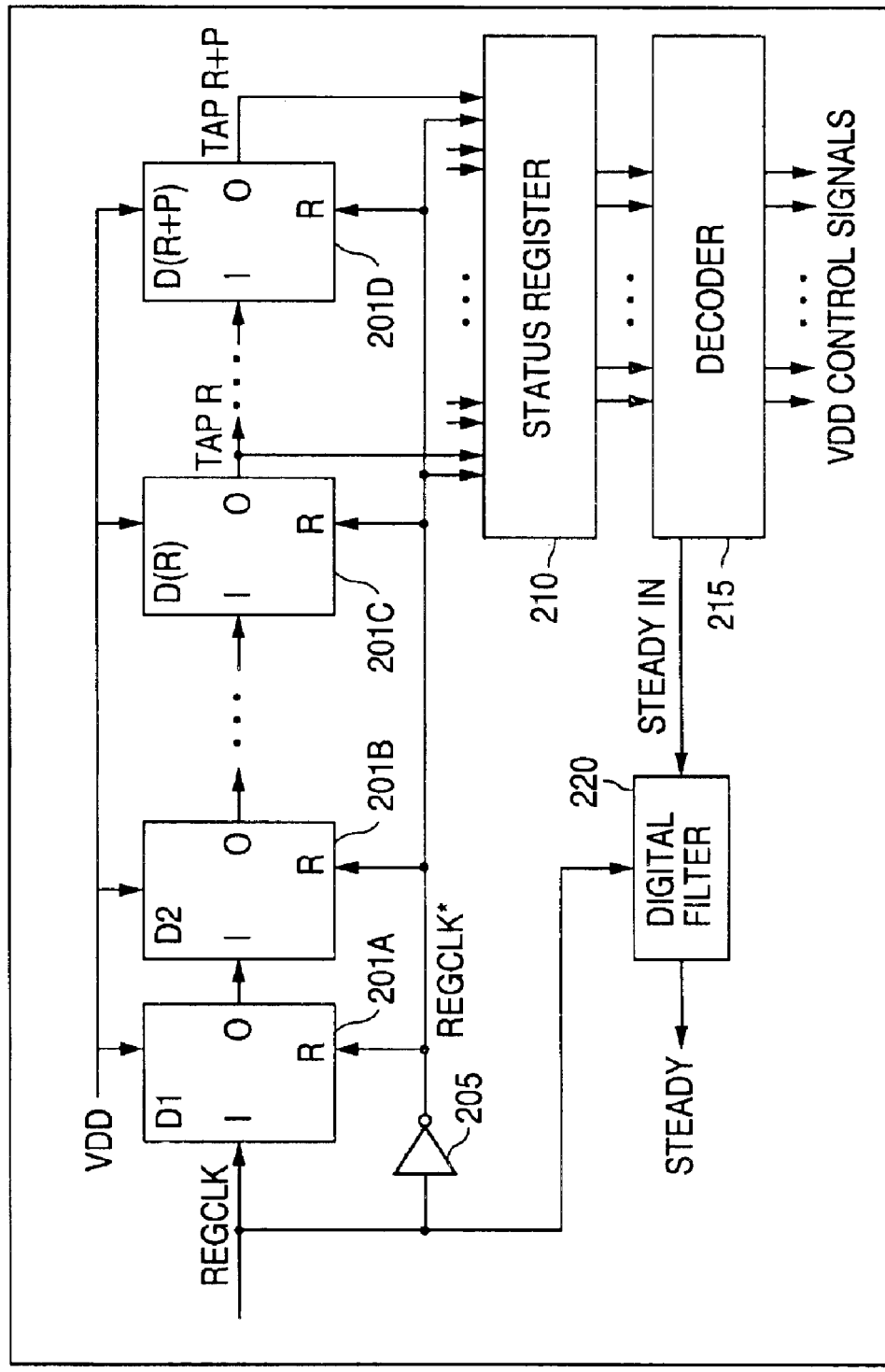
FIG. 5 illustrates an adaptive voltage scaling (AVS) slack time detector according to an alternate exemplary embodiment of the present invention.

FIG. 5 illustrates AVS slack time detector 125 in greater detail according to an alternate exemplary embodiment of the present invention. The first embodiment of AVS slack time detector 125 illustrated in FIG. 2 produced two control signals, namely UP and DOWN, which could be used to adjust the level of VDD in relatively coarse incremental steps or relatively coarse decremental steps. According to the exemplary embodiment illustrated in FIG. 5, AVS slack time detector 125 produces a plurality of control signals that may be used to increment or decrement the level of VDD by relatively small amounts and relatively large amounts.

AVS slack time detector 125 in FIG. 5 is identical in most respects to AVS slack time detector 125 illustrated in FIG. 2. The principal difference is in the number of delay cell 201 outputs that are monitored. AVS slack time detector 125 in FIG. 2 only monitored two delay cell 201 outputs (i.e., K and K+1). AVS slack time detector 125 in FIG. 5 monitors the outputs of more than the two delay cells 201. In FIG. 5, status register 210 monitors the outputs of Tap R through Tap R+P, which represent a total of P+1 delay cell 201 outputs.

Consider an exemplary embodiment in which the longest propagation delay through DSP/CPU system 120 is less than or equal to 6D (i.e., six propagation delays). If the safety margin, M, is one propagation delay and P equals 3, then Tap R is the output of the $7^{th}$ delay cell, Tap R+1 is the output of the $8^{th}$ delay cell, Tap R+2 is the output of the $9^{th}$ delay cell, and Tap R+3 is the output of the $10^{th}$ delay cell. These four delay cell outputs represent the outputs of the K−1 delay cell, the K delay cell, the K+1 delay cell, and the K+2 delay cell, respectively.

Again, the purpose of AVS slack time detector 125 is to control the level of VDD so that a rising edge on the REGCLK clock signal received at the input of delay cell 201A propagates to the output of the K delay cell (Tap R+1), but not to the output of the K+1 delay cell (Tap R+2), by the time a falling edge on the REGCLK clock signal is received. Thus, under optimum conditions, the value of STATUS(K−1, K, K+1, K+2)=1100. However, unlike the case in FIG. 2, decoder 215 in FIG. 5 may generate a plurality of VDD control signals having different incremental step sizes or decremental step sizes according to the value of STATUS (K−1, K, K+1, K+2).

For example, if STATUS(K−1, K, K+1, K+2) is 0000, then decoder 215 may generate a LARGE UP control signal that increments VDD by a relatively large amount (e.g., +0.1 volt step size). This corrects VDD more rapidly for large errors. If STATUS(K−1, K, K+1, K+2) is '1000, then decoder 215 may generate a SMALL UP control signal that increments VDD by a relatively small amount (e.g., +0.01 volt step size). This increases VDD by small amounts for small errors without causing an overshoot.

For example, if STATUS(K−1, K, K+1, K+2) is 1111, then decoder 215 may generate a LARGE DOWN control signal that decrements VDD by a relatively large amount (e.g., −0.1 volt step size). This corrects VDD more rapidly for large errors. If STATUS(K−1, K, K+1, K+2) is 1110, then decoder 215 may generate a SMALL DOWN control signal that decrements VDD by a relatively small amount (e.g., −0.01 volt step size). This decreases VDD by small amounts for small errors without causing an undershoot.

In still another embodiment of the present invention, status register 210 may monitor, for example, six (6) delay cell 201 outputs, thereby giving even greater degrees of fine and coarse adjustments of the level of VDD. For example, under optimum conditions, the value of STATUS(K−2, K−1, K, K+1, K+2, K+3)=111000.

If STATUS(K−2, K−1, K, K+1, K+2, K+3)=000000, 100000, or 110000, then decoder 215 may generate LARGE UP, MEDIUM UP or SMALL UP control signals, respectively. If STATUS(K−2, K−1, K, K+1, K+2, K+3)=111111, 111110, or 111100, then decoder 215 may generate LARGE DOWN, MEDIUM DOWN or SMALL DOWN control signals, respectively.

In the foregoing embodiments, the operation of AVS slack time detector 125 was described in terms of two trigger events, namely a first occurring rising edge of the REGCLK clock signal and the subsequent falling edge of the REGCLK clock signal, that are used to monitor the slack time and control the level of VDD.

However, this is by way of illustration only and should not be construed so as to limit the scope of the present invention. Those skilled in the art will recognize that AVS slack time detector 125 may be easily reconfigured so that a first occurring falling edge of the REGCLK clock signal and a subsequent rising edge of the REGCLK clock signal may be used as trigger events to monitor the slack time and control the level of VDD.

Figure 6:
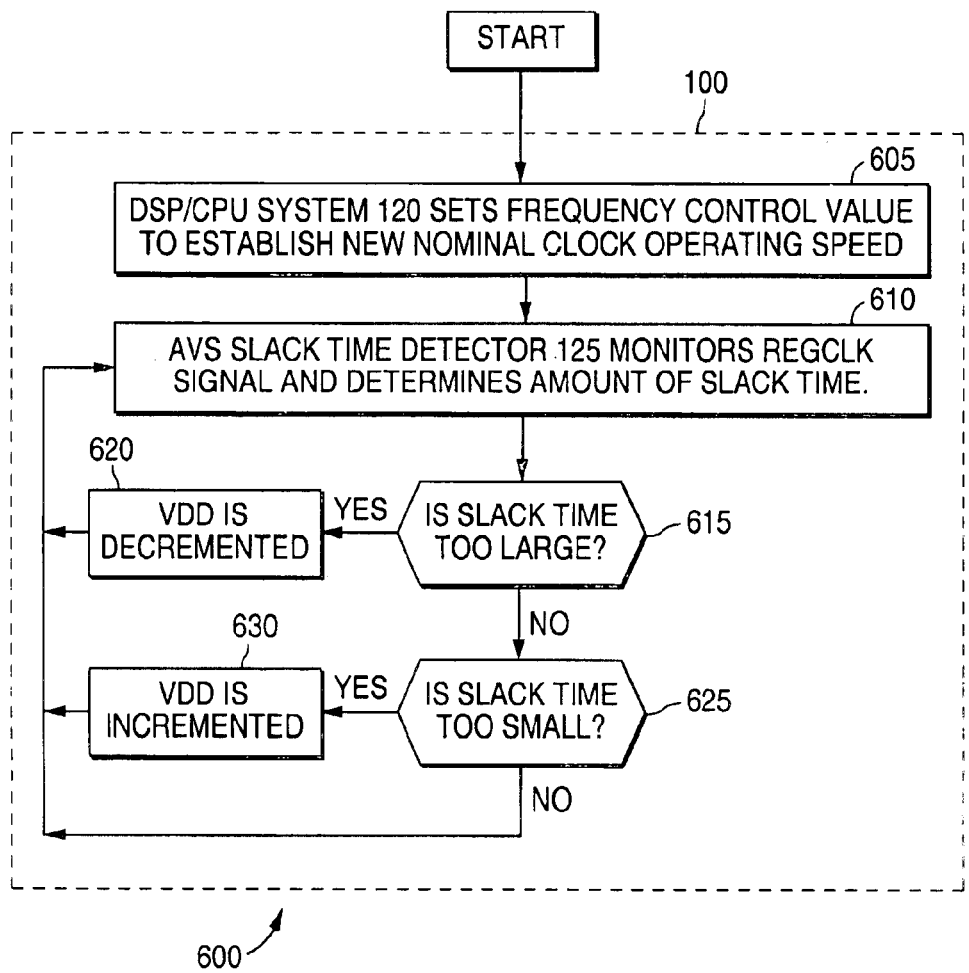
FIG. 6 depicts a flow diagram which illustrates an exemplary method of operating of the adaptive voltage scaling (AVS) slack time detector in the digital processing system of FIG. 1 according to an exemplary embodiment of the present invention.

FIG. 6 depicts flow diagram 600, which illustrates the operation of AVS slack time detector 125 in digital processing system 100 according to an exemplary embodiment of the present invention. Initially, DSP/CPU system 120 sets the value of the FREQUENCY CONTROL signal to establish a new nominal clock operating speed (e.g., 50 MHz) (process step 605). Next, AVS slack time detector 125 monitors the REGCLK signal and determines the amount of slack time, if any. As explained above, the slack time is the time difference between the longest propagation delay in DSP/CPU system 120 and the pulse width of the REGCLK clock signal (process step 610). The longest propagation delay in DSP/CPU system 120 is represented by the total delay, K×D, at the output of the K delay cell 201 and the pulse width of the REGCLK clock signal is the length of time between a rising clock edge and the next falling clock edge of the REGCLK clock signal. Alternatively, the pulse width of the REGCLK clock signal is the length of time between a falling clock edge and the next rising clock edge of the REGCLK clock signal. If the slack time is too large, VDD is decremented (process steps 615 and 620). If the slack time is too small, VDD is incremented (process steps 625 and 630). Otherwise, AVS slack time detector 125 continues to monitor the REGCLK signal and determine the amount of slack time, if any (process step 610).

Although the present invention has been described in detail, those skilled in the art should understand that they can make various changes, substitutions and alterations herein without departing from the spirit and scope of the invention in its broadest form.

What is claimed is:

1. A digital circuit comprising:
    a digital processing component capable of operating at a plurality of selected clock frequencies, wherein a maximum delay time of a critical path in said digital processing component is determined by a level of a power supply, VDD, of said digital processing component;
    an adjustable power supply capable of supplying VDD to said digital processing component; and
    power supply adjustment circuitry that receives a first selected clock signal and adjusts said level of VDD such that said maximum delay time of said critical path is less than a pulse-width duration between a first clock edge of said first selected clock signal and a second clock edge of said first selected clock signal immediately following said first clock edge.

2. The digital circuit as set forth in claim 1 wherein said power supply adjustment circuitry adjusts said level of VDD such that said maximum delay time is less than said pulse-width duration by not more than a maximum slack time threshold amount.

3. The digital circuit as set forth in claim 2 wherein said power supply adjustment circuitry adjusts said level of VDD such that said maximum delay time is less than said pulse-width duration by not less than a minimum slack time threshold amount.

4. The digital circuit as set forth in claim 3 wherein said power supply adjustment circuitry comprises clock generating circuitry capable of receiving an external reference clock signal and generating therefrom said first selected clock signal.

5. The digital circuit as set forth in claim 4 wherein said power supply adjustment circuitry compares a frequency of said first selected clock signal to a frequency of a previous selected clock signal currently applied to said digital processing component and, in response to a determination that said first selected clock signal frequency is greater than said previous selected clock signal frequency, causes said clock generating circuitry to temporarily disable said first selected clock signal from being applied to said digital processing component.

6. The digital circuit as set forth in claim 5 wherein said power supply adjustment circuitry causes said clock generating circuitry to apply said first selected clock signal to said digital processing component after said power supply adjustment circuitry adjusts said level of VDD such that said maximum delay time is less than said pulse-width duration by not more than a maximum slack time threshold amount and by not less than a minimum slack time threshold amount.

7. The digital circuit as set forth in claim 5 wherein said power supply adjustment circuitry, in response to a determination that said first selected clock signal frequency is less than said previous selected clock signal frequency, causes said clock generating circuitry to apply said first selected clock signal to said digital processing component while said power supply adjustment circuitry adjusts said level of VDD such that said maximum delay time is less than said pulse-width duration by not more than a maximum slack time threshold amount and by not less than a minimum slack time threshold amount.

8. The digital circuit as set forth in claim 7 wherein said power supply adjustment circuitry comprises N delay cells coupled in series, each of said N delay cells having a delay D determined by said level of VDD, wherein said first clock edge is applied to an input of a first delay cell and ripples sequentially through said N delay cells, and wherein said power supply adjustment circuitry: i) monitors outputs of at least a K delay cell and a K+1 delay cell, ii) determines that said first clock edge has reached an output of said K delay cell and has not reached an output of said K+1 delay cell, and iii) generates a control signal capable of adjusting VDD.

9. The digital circuit as set forth in claim 8 wherein said power supply adjustment circuitry determines that said first clock edge has reached said K delay cell output and has not reached said K+1 delay cell output when said second clock edge is applied to said first delay cell input.

10. The digital circuit as set forth in claim 8 wherein a total delay from said first delay cell input to said K delay cell output is greater than said maximum delay time of said critical path.

11. The digital circuit as set forth in claim 8 wherein said power supply adjustment circuitry increases VDD if said first clock edge has not reached said K delay cell output.

12. The digital circuit as set forth in claim 8 wherein said power supply adjustment circuitry decreases VDD if said first clock edge has reached said K+1 delay cell output.

13. A method of operating a digital circuit for adjusting a power supply level, VDD, of a digital processing component capable of operating at a plurality of selected clock frequencies, wherein a maximum delay time of a critical path in the digital processing component is determined by a level of a power supply, VDD, of the digital processing component, the method of operating the digital circuit comprising the steps of:

supplying VDD to the digital processing component from an adjustable power supply;

receiving a first selected clock signal; and adjusting the level of VDD such that the maximum delay time of the critical path is less than a pulse-width duration between a first clock edge of the first selected clock signal and a second clock edge of the first selected clock signal immediately following the first clock edge.

14. The method as set forth in claim 13 wherein the step of adjusting comprises the sub-step of adjusting the level of VDD such that the maximum delay time is less than the pulse-width duration by not more than a maximum slack time threshold amount.

15. The method as set forth in claim 14 wherein the step of adjusting comprises the sub-step of adjusting the level of VDD such that the maximum delay time is less than the pulse-width duration by not less than a minimum slack time threshold amount.

16. The method as set forth in claim 15 wherein the step of receiving the first selected clock signal comprises the sub-step of receiving an external reference clock signal and generating therefrom the first selected clock signal.

17. The method as set forth in claim 16 further comprising the steps of:

comparing a frequency of the first selected clock signal to a frequency of a previous selected clock signal currently applied to the digital processing component; and in response to a determination that the first selected clock signal frequency is greater than the previous selected clock signal frequency, temporarily disabling the first selected clock signal from being applied to the digital processing component.

18. The method as set forth in claim 17 further comprising the step of applying the first selected clock signal to the digital processing component after the power supply adjustment circuitry adjusts the level of VDD such that the maximum delay time is less than the pulse-width duration by not more than a maximum slack time threshold amount and by not less than a minimum slack time threshold amount.

19. The method as set forth in claim 17 further comprising the step, in response to a determination that the first selected clock signal frequency is less than the previous selected clock signal frequency, of apply the first selected clock signal to the digital processing component while the power supply adjustment circuitry adjusts the level of VDD such that the maximum delay time is less than the pulse-width duration by not more than a maximum slack time threshold amount and by not less than a minimum slack time threshold amount.

20. The method as set forth in claim 19 wherein the digital circuit comprises a power supply adjustment circuitry comprising N delay cells coupled in series, each of the N delay cells having a delay D determined by the level of VDD, wherein the first clock edge is applied to an input of a first delay cell and ripples sequentially through the N delay cells, and wherein the method further comprises the steps of:

monitoring outputs of at least a K delay cell and a K+1 delay cell;

determining that the first clock edge has reached an output of the K delay cell and has not reached an output of the K+1 delay cell; and generating a control signal capable of adjusting VDD.

21. The method as set forth in claim 20 further comprising the step of determining that the first clock edge has reached the K delay cell output and has not reached the K+1 delay cell output when the second clock edge is applied to the first delay cell input.

22. The method as set forth in claim 20 wherein a total delay from the first delay cell input to the K delay cell output is greater than the maximum delay time of the critical path.

23. The method as set forth in claim 20 further comprising the step of increasing VDD if the first clock edge has not reached the K delay cell output.

24. The method as set forth in claim 20 further comprising the step of decreasing VDD if the first clock edge has reached the K+1 delay cell output.

* * * * *

UNITED STATES PATENT AND TRADEMARK OFFICE
CERTIFICATE OF CORRECTION

PATENT NO. : 6,868,503 B1
DATED : March 15, 2005
INVENTOR(S) : Dragan Maksimovic et al.

It is certified that error appears in the above-identified patent and that said Letters Patent is hereby corrected as shown below:

<u>Column 8,</u>
Line 39, delete "ar" and insert -- an --; and delete "a*1" and insert -- a≠1 --;

<u>Column 9,</u>
Line 42, delete "(FP)" and insert -- (FF) --;
Line 66, delete "µ" and insert -- 11 --.

Signed and Sealed this

Eleventh Day of April, 2006

JON W. DUDAS
*Director of the United States Patent and Trademark Office*